(12) United States Patent
Dahlgren

(10) Patent No.: US 8,665,381 B2
(45) Date of Patent: Mar. 4, 2014

(54) VIEWING CONE ADJUSTMENT SYSTEM

(75) Inventor: Brett E. Dahlgren, Lebanon, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2497 days.

(21) Appl. No.: 11/112,640

(22) Filed: Apr. 22, 2005

(65) Prior Publication Data

US 2006/0238658 A1 Oct. 26, 2006

(51) Int. Cl.
*H04N 9/31* (2006.01)
*H04N 9/28* (2006.01)

(52) U.S. Cl.
USPC ........... 348/745; 348/744; 348/756; 348/759; 348/771; 353/77

(58) Field of Classification Search
USPC ............... 348/745, 744, 756, 759, 771, 806; 353/77, 76, 70, 30, 31
See application file for complete search history.

(56) References Cited

U.S. PATENT DOCUMENTS

| 4,439,027 A | 3/1984 | Shioda |
| 4,452,509 A | 6/1984 | VanBreemen |
| 6,113,240 A * | 9/2000 | Iizuka ............................ 353/31 |
| 6,264,333 B1 * | 7/2001 | Iizuka ........................... 353/101 |
| 6,592,228 B1 | 7/2003 | Kawashima |
| 6,633,346 B1 | 10/2003 | Yamamoto |

FOREIGN PATENT DOCUMENTS

JP 61159874 7/1986

* cited by examiner

*Primary Examiner* — Jefferey Harold
*Assistant Examiner* — Jean W Desir

(57) ABSTRACT

One embodiment of a viewing cone adjustment system includes a projection lens that defines a projection lens optical axis adjustably offset from a viewing screen optical axis, and an image source device that defines an image source optical axis adjustably offset from the projection lens optical axis.

29 Claims, 1 Drawing Sheet

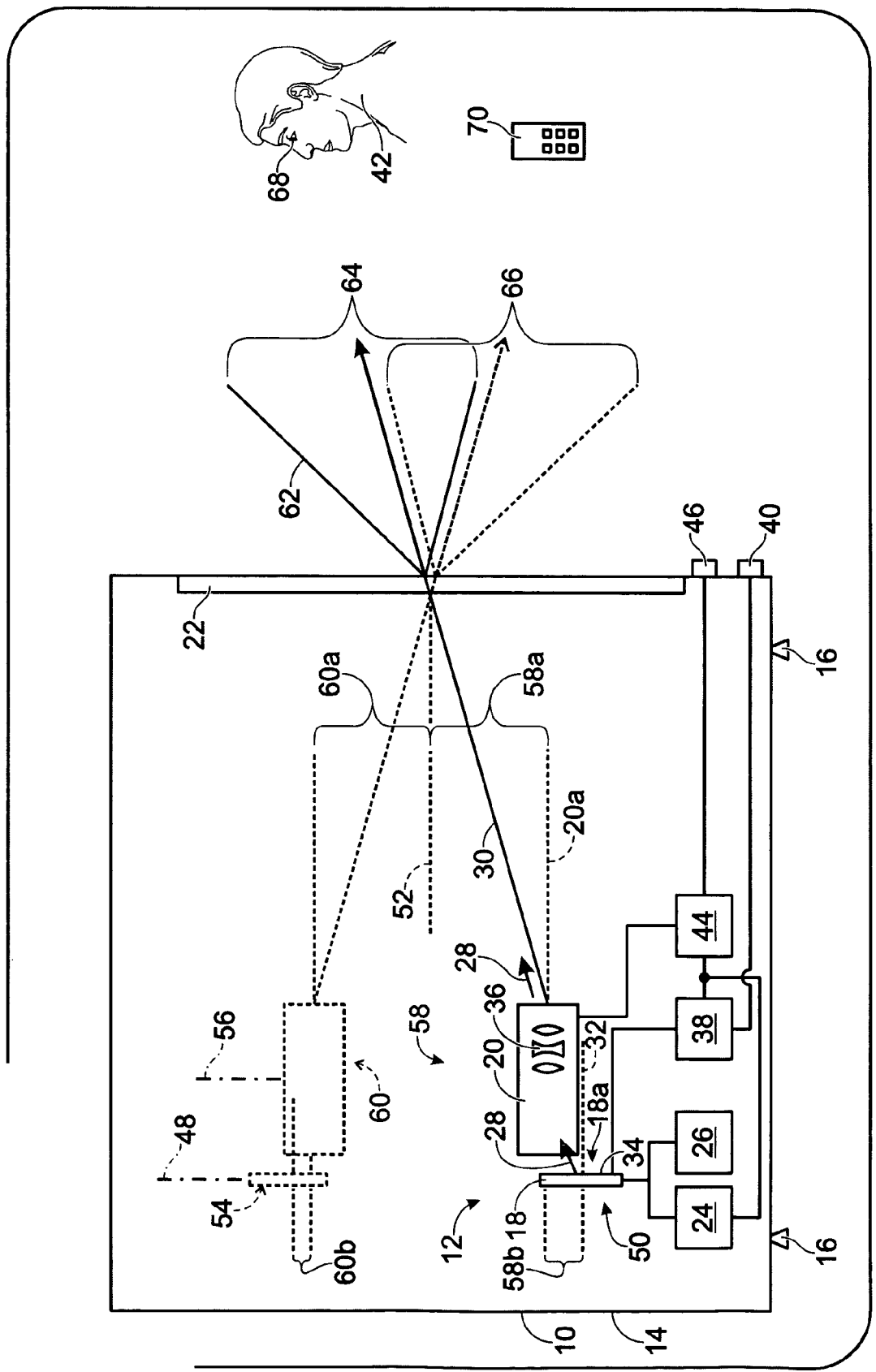

VIEWING CONE ADJUSTMENT SYSTEM

BACKGROUND

Display devices, such as rear projection television sets, may define a viewing cone fixedly positioned in a predetermined position by the manufacturer. Accordingly, especially in television sets having a high gain, a viewer that is not positioned with their eyes at the display screen's optical axis or within the viewing cone may see a much dimmer image than a viewer having their eyes positioned at the display screen's optical axis and within the viewing cone. A standing viewer, therefore, may see a much dimmer image than a seated viewer. The optical axis of the display device may be adjusted by physically adjusting the position of the entire display device, such as propping blocks under the front of the television set to raise the position of the display screen's optical axis and viewing cone. Such a method may be cumbersome, dangerous, and unaesthetic. Accordingly, it may be desirable to provide a viewing cone adjustment system that may allow adjustment of the viewing cone by a viewer, without moving the entire display device, to enhance the viewing experience.

BRIEF DESCRIPTION OF THE DRAWINGS

FIG. 1 is a schematic side view of one embodiment of a display device including one embodiment of viewing cone adjustment system.

DETAILED DESCRIPTION OF THE DRAWINGS

FIG. 1 is a schematic side view of one embodiment of a display device 10 including one embodiment of viewing cone adjustment system 12. Display device 10 may be an image display device such as a computer monitor or a television set, for example. In the embodiment shown, display device 10 is a high gain rear projection television set including a housing 14 and a base 16.

Positioned within housing 14 is a modulator 18, a projection lens system 20 and a display screen 22. Modulator 18 may be an electronic micro-mirror device including a plurality of individually movable micro mirrors 18a that may each be controlled by a controller, such as a computer 24. Modulator 18 may be connected to a light source 26 such that modulator 18 projects a light image 28 along an image path 30 through display device 10. Modulator 18 may define a modulator optical axis 32 extending centrally and substantially perpendicularly from a front surface 34 of modulator 18. Projection lens system 20 may include a plurality of lenses 36 or other projection devices to project image 28 from modulator 18 along image path 30 to display screen 22. Display screen 22 may be a Fresnel lens or any other display structure as may be utilized for a particular application.

Modulator 18 may be connected to an adjustment mechanism 38 which may be connected to an adjustment control device 40 positioned on display device 10 for manipulation by a viewer 42. Projection lens system 20 may be connected to an adjustment mechanism 44 which may be connected to an adjustment control device 46 positioned on display device 10 for manipulation by viewer 42. Each of adjustment mechanisms 38 and 44 may be an automatic adjustment mechanism such as a motor or a manual adjustment mechanism such as a manual crank system that operates to physically move modulator 18 and projection lens system 20, respectively. Each of adjustment control devices 40 and 46 may be an electronic switch adapted to control a motor, or a manually adjustable control knob that operates a manual crank system, for example. Of course, any adjustment mechanism or control device may be utilized for a particular application. Accordingly, viewer 42 may operate one or both of adjustment control devices 40 and 46 to move a position of one or both of modulator 18 and projections lens system 20.

In particular, adjustment mechanism 38 may operate to move modulator 18 within housing 14 upwardly and downwardly along a modulator movement axis 48. In one example, modulator 18 may be moved from a first position 50 (shown in solid lines) below a centrally located optical axis 52 of display screen 22 to a second position 54 (shown in dash lines) above optical axis 52. Similarly, adjustment mechanism 44 may operate to move projection lens system 20 within housing 14 upwardly and downwardly along a projection lens system movement axis 56. In one example, projection lens system 20 may be moved from a first position 58 (shown in solid lines) below centrally located optical axis 52 of display screen 22 to a second position 60 (shown in dash lines) above optical axis 52. In this FIG. 1 a relatively large movement of both modulator 18 and projection lens system 20 is shown for ease of illustration. However, movement of the modulator 18 and/or the projection lens system 20 may be through any distance, such as through a relatively small distance, along their respective movement axes, as may be desired for a particular viewing cone adjustment.

Movement of projection lens system 20 with respect to optical axis 52 of display screen 22 will result in movement of a viewing cone 62 projected from display screen 22. For example, movement of projection lens system 20 from first position 58 to second position 60 will move viewing cone 62 from a first position 64 (shown in solid lines) to a second position 66 (shown in dash lines). In first position 58 projection lens system 20 is unaligned with optical axis 52 of display screen 22 such that a projection lens optical axis 20a is offset from optical axis 52 of display screen 22 by a distance 58a. In second position 60 projection lens system 20 is unaligned with optical axis 52 of display screen 22 such that projection lens optical axis 20a is offset from optical axis 52 of display screen 22 by a distance 60a.

Offset of projection lens system optical axis 20a from optical axis 52 of display screen 22 may result in image 28 being positioned off center on screen 22, i.e., image 28 may not be centered on screen 22. Accordingly, a position of modulator 18 may be adjusted to center image 28 on screen 22. In particular, when projection lens system 20 is positioned in first position 58, modulator 18 may be moved with respect to projection lens system 20 such that optical axis 32 of modulator 18 may be unaligned with optical axis 20a of projection lens system 20 and offset by a distance 58b. When projection lens system 20 is positioned in second position 60, modulator 18 may be moved with respect to projection lens system 20 such that optical axis 32 of modulator 18 may be unaligned with optical axis 20a of projection lens system 20 and offset by a distance 60b. Such positioning of modulator 18 may be conducted to center image 28 on display screen 22.

The position of viewing cone 62, therefore, may be adjusted so that the viewing cone 62 will be positioned to encompass the eyes 68 of viewer 42 so that the viewer will see a brighter image 28 than may be projected to a viewer with their eyes positioned outside viewing cone 62. At approximately the same time, the position of modulator 18 may be adjusted so that image 28 will remain centered on screen 22 for viewing by viewer 42. For example, viewer 42 may adjust the position of viewing cone 62 such that the viewer's eyes 68 will be positioned within viewing cone 62 when the viewer is seated on a chair or couch positioned in front on display device 10. Such adjustment of viewing cone 62 may be conducted by viewer 42 by adjustment of adjustment control device 40 and/or 46 without movement of the entirety of housing 14 of display device 10. Adjustment of the position of viewing cone 62, and therefore the adjustment of projection lens system 20 and the corresponding adjustment of modulator 18, may be conducted by the viewer through the use of a remote device 70 which may be hand held by viewer 42. In the example of adjustment of the position of viewing cone 62 by use of remote device 70, viewer 42 may control positioning of projection lens system 20 as desired, and computer 24 may automatically guide the positioning of modulator 18 such that image 28 remains centered on screen 22 as projection lens system 20 is moved. In particular, computer 24 may include several different individual computing components wherein one computing component may control movement of the individual pixels of modulator 18, and wherein another computing component may control or guide positioning of the entirety of modulator 18 along movement axis 48. In the embodiment wherein viewer 42 may manually adjust the position of projection lens system 20, such as by a hand crank mechanism 38, the viewer may also adjust the position of modulator 18 with a second hand crank mechanism 44. In yet another embodiment, crank mechanism 44 may be coupled to crank mechanism 38 such that image 28 remains centered on screen 22 as viewer 42 manipulates crank mechanism 38. In another embodiment, projection lens system 20 and modulator 18 may be fixedly offset from viewing screen optical axis 52 such that viewing cone 62 is fixedly positioned in a predetermined position by a manufacturer.

Other variations and modifications of the concepts described herein may be utilized and fall within the scope of the claims below.

We claim:

1. A viewing cone adjustment system, comprising:
   a projection lens that defines a projection lens optical axis adjustably offset from a viewing screen optical axis; and
   an image source device that defines an image source optical axis adjustably offset from said projection lens optical axis.

2. The system of claim 1 further comprising a rear projection television viewing screen that defines said viewing screen optical axis.

3. The system of claim 1 further comprising a Fresnel screen that defines said viewing screen optical axis.

4. The system of claim 1 wherein said image source comprises a modulator.

5. The system of claim 4 wherein said modulator comprises an electronic micro-mirror device.

6. The system of claim 1 wherein adjustment of said projection lens optical axis from said viewing screen optical axis and adjustment of said image source optical axis from said projection lens optical axis adjusts a position of a viewing cone of a viewing screen.

7. The system of claim 1 wherein said adjustment system is housed within a rear projection television.

8. The system of claim 1 wherein said image source optical axis is adjusted with respect to said projection lens optical axis to center an image on a viewing screen.

9. The system of claim 1 further comprising a motorized adjustment mechanism that adjusts said projection lens optical axis and said image source optical axis.

10. The system of claim 1 further comprising a manual adjustment mechanism that adjusts said projection lens optical axis and said image source optical axis.

11. A rear projection television, comprising:
    a viewing screen that defines a viewing screen optical axis;
    a projection lens that defines a projection lens optical axis offset from said viewing screen optical axis, wherein a position of said projection lens is adjustable with respect to said viewing screen; and
    an image source device that defines an image source optical axis offset from said projection lens optical axis, wherein a position of said image source device is adjustable with respect to said viewing screen.

12. The television of claim 11 that defines a viewing cone axis offset from said viewing screen optical axis.

13. The television of claim 12 wherein said viewing cone axis is positioned upwardly of said viewing screen optical axis.

14. The television of claim 12 wherein said viewing cone axis is positioned downwardly of said viewing screen optical axis.

15. The television of claim 11 further comprising a motor that adjustably positions said projection lens optical axis.

16. The television of claim 11 further comprising a motor that adjustably positions said image source optical axis.

17. The television of claim 15 further comprising an adjustment control device positioned to be manipulated by a viewer, said adjustment control device adapted to control said motor.

18. The television of claim 16 further comprising an adjustment control device positioned to be manipulated by a viewer, said adjustment control device adapted to control said motor.

19. The television of claim 11 further comprising a viewing cone of said viewing screen, wherein a position of said viewing cone is adjusted with respect to said viewing screen by adjustment of said projection lens and said image source device.

20. The television of claim 19 wherein said viewing cone is angularly adjusted with respect to said viewing screen by adjustment of said projection lens and said image source device.

21. A display system, comprising:
    a display screen that defines a display screen optical axis;
    a projection lens set that defines a projection lens set optical axis unaligned with and movably adjustable with respect to said display screen optical axis; and
    a modulator that defines a modulator optical axis unaligned with and movably adjustable with respect to said projection lens set optical axis.

22. The system of claim 21 further comprising a light source that projects light to said modulator.

23. The system of claim 21 further comprising a computer that controls said modulator.

24. The system of claim 21 wherein said projection lens set and said modulator together define a viewing cone of said screen, and wherein a position of said viewing cone with respect to said screen is adjusted by adjustment of said projections lens set and said modulator.

25. A method of adjustably positioning a viewing cone of a display screen, comprising:
    adjusting a position of a projection lens optical axis with respect to a display screen optical axis; and
    adjusting a position of an image source optical axis with respect to said projection lens optical axis.

26. The method of claim 25 wherein positioning said projection lens optical axis downwardly of said display screen optical axis positions an axis of a viewing cone upwardly of said display screen optical axis.

27. An image display apparatus, comprising:
    means for displaying an image, said means for displaying defining a first optical axis;

means for producing an image, said means for producing defining a second optical axis, and wherein said means for producing is movably positionable with respect to a means for projecting; and means for projecting an image from said means for producing to said means for displaying, said means for projecting defining a third optical axis, and wherein said means for projecting is movably positionable with respect to a means for displaying, wherein said third optical axis is unaligned with said first optical axis and wherein said second optical axis is unaligned with said third optical axis.

28. The apparatus of claim 27 further comprising means for adjusting a position of said means for producing an image.

29. The apparatus of claim 27 wherein said means for producing an image and said means for projecting an image together define a movably positionable viewing cone of said means for displaying an image.

\* \* \* \* \*